(12) United States Patent
Le Bouette et al.

(10) Patent No.: US 6,859,623 B2
(45) Date of Patent: Feb. 22, 2005

(54) WAVELENGTH ALLOCATION SCHEME AND WDM EQUIPMENT

(75) Inventors: Claude Le Bouette, Brétigny-sur-Orge (FR); Michel Sotom, Toulouse (FR); Stephano Bruno, Bourg-La-Reine (FR); Michel Audoin, Villeneuve-St-Georges (FR)

(73) Assignee: Alcatel, Paris (FR)

(\*) Notice: Subject to any disclaimer, the term of this patent is extended or adjusted under 35 U.S.C. 154(b) by 336 days.

(21) Appl. No.: 09/880,752

(22) Filed: Jun. 15, 2001

(65) Prior Publication Data

US 2002/0024695 A1 Feb. 28, 2002

(30) Foreign Application Priority Data

Jun. 16, 2000 (EP) .............................................. 00440177

(51) Int. Cl.$^7$ ................................................ H04B 10/00
(52) U.S. Cl. ............................ 398/94; 398/69; 398/164
(58) Field of Search ............................... 398/79, 91, 69, 398/164, 94

(56) References Cited

U.S. PATENT DOCUMENTS 5,825,949 A  \* 10/1998  Choy et al. .................... 385/24

FOREIGN PATENT DOCUMENTS

| EP | 0 829 981 A2 | 3/1998 |
| WO | WO 98/06191 | 2/1998 |

\* cited by examiner

*Primary Examiner*—Jason Chan
*Assistant Examiner*—Christina Y. Leung
(74) *Attorney, Agent, or Firm*—Sughrue Mion, PLLC

(57) ABSTRACT

The invention is related to a wavelength allocation scheme for a WDM (Wavelength Division Multiplex) equipment with a distribution of used optical channels that are arranged around a saturation channel in a way that the total spectrum of the optical channels is balanced independent from the number of equipped optical channels.

8 Claims, 3 Drawing Sheets

WAVELENGTH ALLOCATION SCHEME AND WDM EQUIPMENT

PRIOR ART

The invention is related to a wavelength allocation scheme for a WDM (Wavelength Division Multiplex) equipment with a distribution of used optical channels that are arranged around a saturation channel in a way that the total spectrum of the optical channels is balanced independent from the number of the equipped optical channels.

The invention is also related to a WDM equipment in a rack using subracks and having slots for a plurality of transponder boards using a wavelength allocation scheme for a WDM equipment with a distribution of used optical channels that are arranged around a saturation channel in a way that the total spectrum of the optical channels is balanced independent from the number of equipped optical channels.

Today's telecommunication core network functions with two basic layers: the service layer, connecting the end user, and the SONET/SDH layer, performing four critical operations: Electrical time division multiplexing, time slot grooming, high speed protection against equipment and network failure, and guaranteed service delivery. But networks expand, bandwidth demands increase, traffic becomes unmanageable, and SONET/SDH restricts flexibility in service offerings. The need for new technology has emerged. Dense WDM in the optical layer will provide a minimum of 40 times the band width currently transported on a single fiber. The implementation of dense WDM optical amplifier systems and ITU compliant channel spacing, allows maximum access to the entire 1550 nm pass band.

Terminal stations provide multiplexing and de-multiplexing of the tributary signals. A multiplexer, as shown in FIG. 1, is able to mix up to e.g. 40 channels in the 1550 nm region and to launch the combined signal into one single fiber. The line stations amplify the optical multiplex signal without the need of optical to electrical conversion. Typical transmission lengths of up to 900 km can be achieved on a 0.25 dB/km fiber. Two kind of interfaces are possible. The first type takes into account already coloured signals from the SDH equipment. The other type handle non-coloured signals from other network elements and transform them into coloured ones.

In this case the transponder boards 1 operate the wavelength translation needed to convert each tributary signal into a precise ITU optical channel.

One of the most important parameters in Wavelength Division Multiplexing is the optical power at the input of each optical amplifier. Their characteristics depend on this parameter. It imposes their gain and noise spectral response, and a variation of the number of channels may affect the existing traffic. To overcome this effect, the saturation wavelength has been introduced in the WDM equipment. It is an extra channel that does not carry any traffic. Its power changes accordingly to the number of transmitted channels. This allows to keep the total optical power constant at the input of the amplifier string whatever the number of channels is. This functionality provides the operator a secure way to upgrade the capacity of the system without affecting the channels already in service. Adding a new channel is just: plug and transmit. The wavelength of this saturation channel is allocated in the middle of the wavelength grid.

In the actual solution the transponder boards are distributed among several racks 6 and subracks 7 in an equipment. On the other side the racks 6 are not always entirely filled with boards depending on the number of equipped channels. In the actual solutions the tributary shelves are related to the optical channel in the WDM grid in a way, that the first transponder board provides the optical channel at the lowest possible wavelength. Adding new transponder boards they are related to optical channels at incrementally higher wavelengths.

FIG. 2 the situation in using a 16 channel WDM system equipped with 16 transponder boards 1. The first optical channel 5 with wavelength λ1 is related to the transponder board 1 named I/O1. The second optical channel 5 has than a wavelength λ2 related to the transponder board 1 named I/O2 and so on. FIG. 2 further shows a customer interface shelf 3 and a line board 2 which houses, for example, an amplifier.

In the case of partial equipment, where only the transponder boards 1, named I/O1-I/O8, are equipped, there is a resulting spectrum imbalance, since only λ1 to λ8 are active wavelengths. This causes an optical amplifier tilt gain, and reduces the system performance. Further, due to the high power level for compensating the inactive channels, interference occurs between the saturation channel 4 and the next active optical channel 5.

DESCRIPTION OF THE INVENTION

To over come this problem the invention proposes to use a new wavelength to transponder allocation scheme.

The invention solves the problem with a wavelength allocation scheme for a WDM (Wavelength Division Multiplex) equipment with a distribution of used optical channels that are arranged around a saturation channel in a way that the total spectrum of the optical channels is balanced independent from the number of equipped optical channels.

This allocation scheme improves the performance of the WDM equipment because the optical channels are better isolated against high power saturation channel when using only a few optical channels.

Additional protection is available by the interleaved allocation of optical channels due to different sub racks in the case of a sub rack failure. The allocation scheme does not require a special equipment. It can be achieved on board with specific routing at the multiplexing and demultiplexing level.

Figure 1:
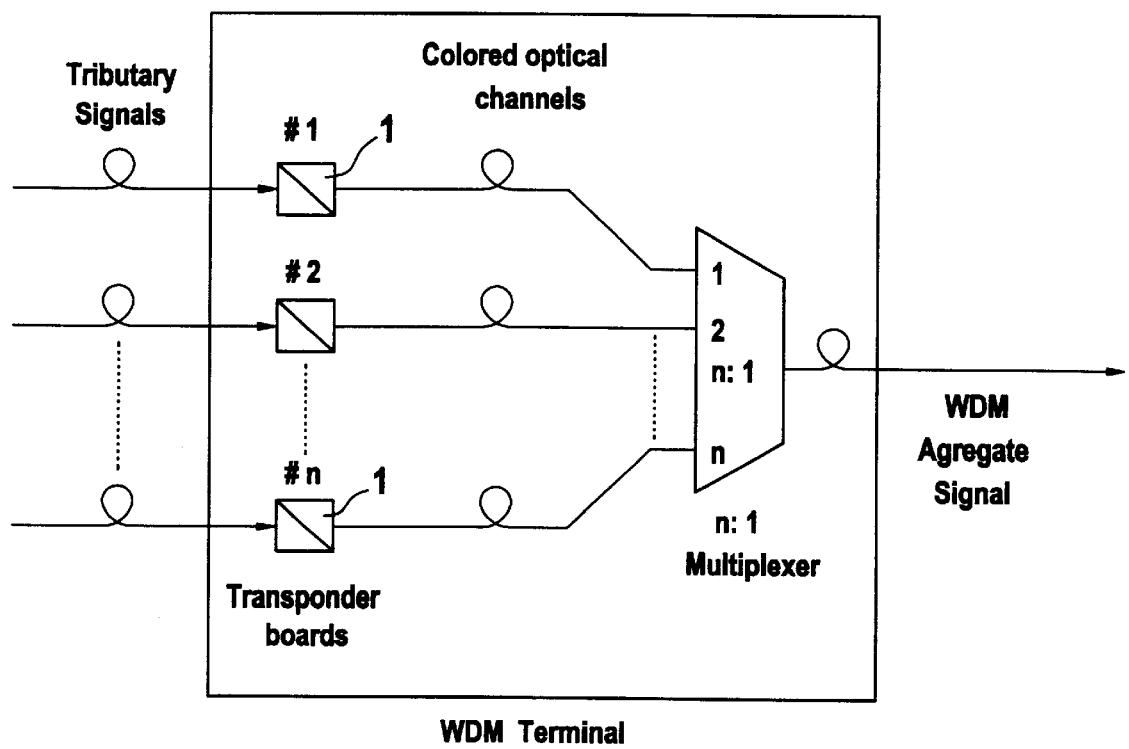
FIG. 1 shows a WDM terminal with a multiplexer.
Figure 2:
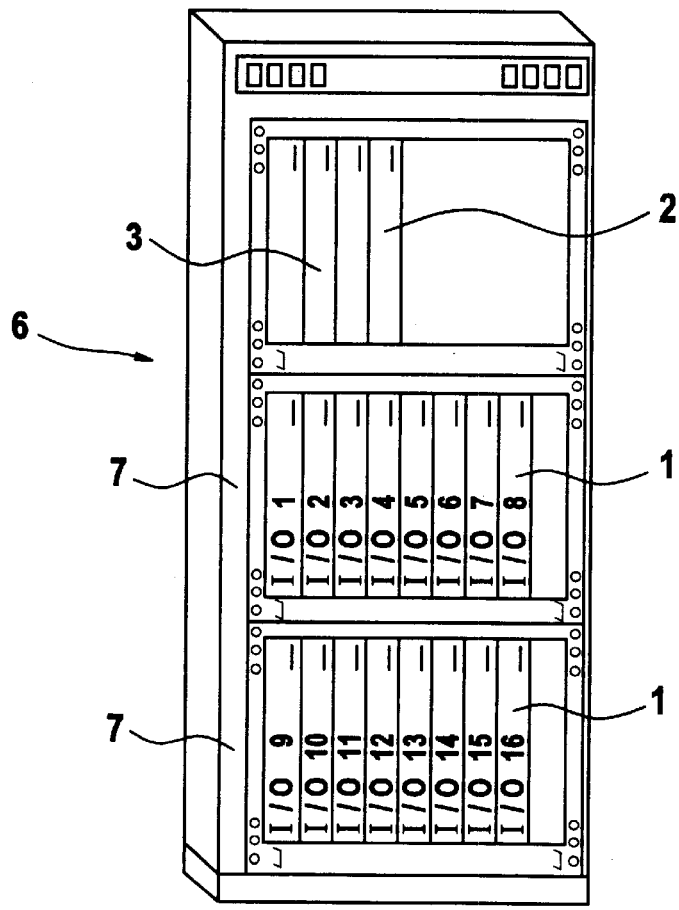
FIG. 2 shows a 16 channel WDM system with 16 transponder boards.
Figure 2:
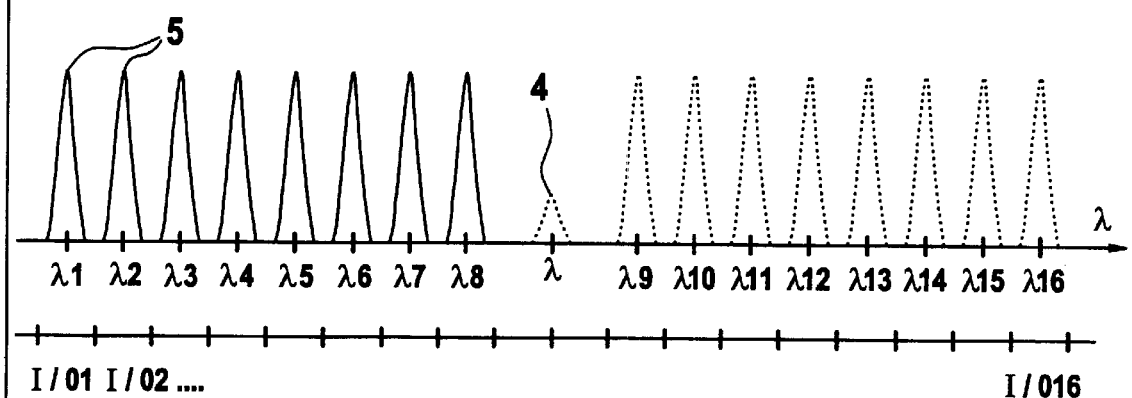
Figure 3:
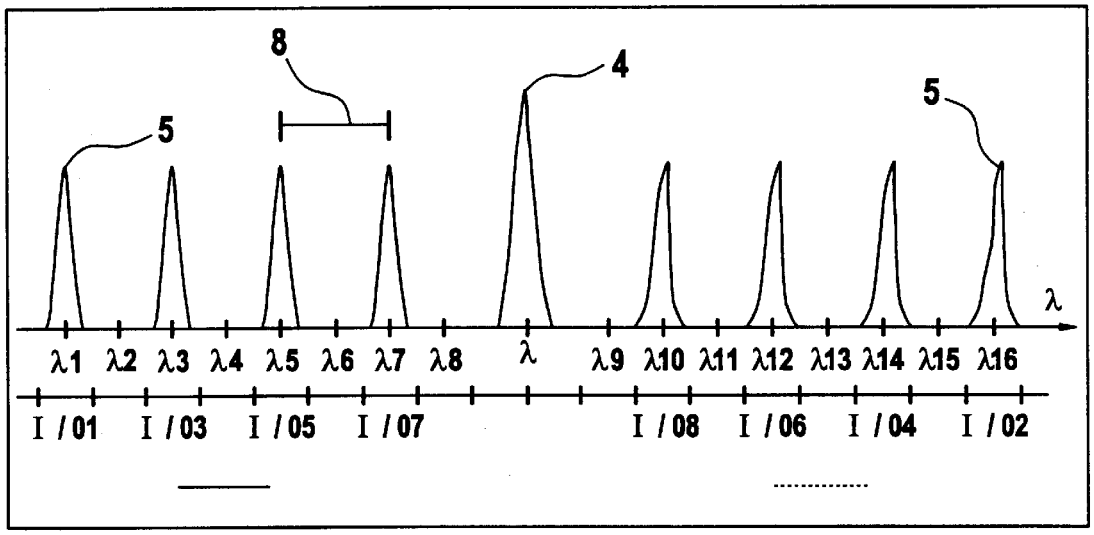
FIG. 3 shows the wavelength allocation scheme for a 16 channel WDM system and a WDM equipment equipped with 8 transponder boards.
Figure 4:
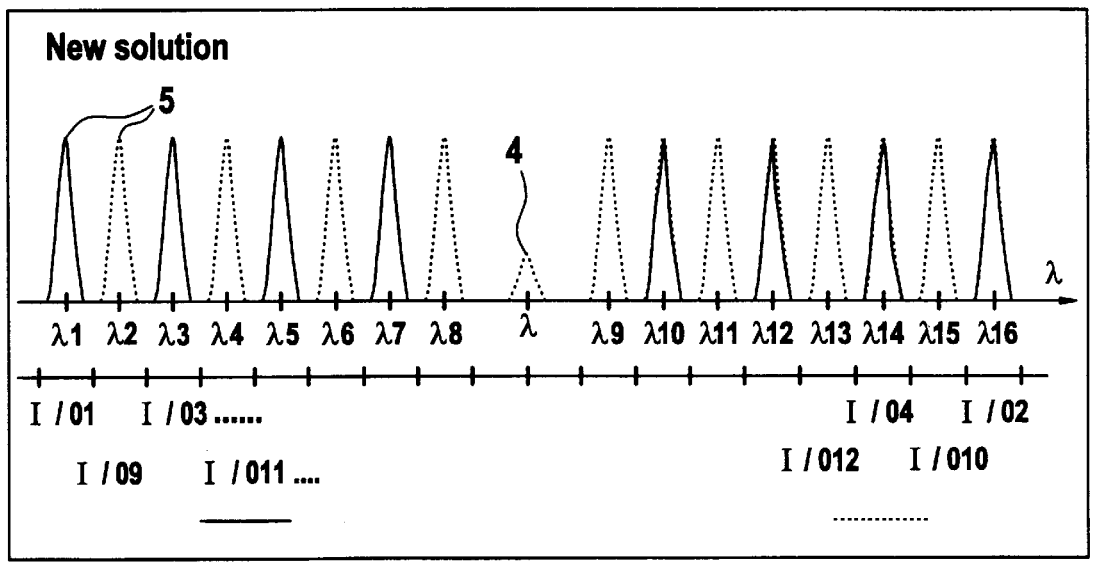
FIG. 4 shows a wavelength allocation scheme with two sub racks of 8 transponder boards and a 16 channel WDM system.

FIG. 3 shows the wavelength allocation for a 16 channel WDM system and a WDM equipment equipped with 8 transponder boards.

In this embodiment the odd numbers of transponder boards are related to the wavelengths below the saturation channel 4 and the even numbers of transponder boards are related to the wavelengths above the saturation channel 4. The allocation starts from both ends of the WDM channels.

In this example the wavelength λ1 is related to the first odd transponder board I/O1, the wavelength λ16 is used for the optical channel 5 related to the first even transponder board I/O2. So a constant interleave space 8 between the optical channels exists.

The interleave space 8 in this example is one channel reserved for the second available sub rack in this embodiment.

Again the wavelength allocation starts from the band ends, independent for both sub racks.

The invention is not restricted to the allocation scheme described above. Every allocation scheme with the following basic functions is considered:

1. the spectrum of the optical channels must be balanced around a saturation channel and independent from the number of equipped optical channels
2. the optical channels of at least one sub rack must be spread over the whole spectrum of the WDM grid.
3. a number of optical channels is an integer divisor of the maximum possible channel number must be spread over the whole spectrum of the WDM grid.
4. the optical channels must be allocated as far as possible from the saturation wavelength.

What is claimed is:

1. A wavelength allocation scheme used in a WDM network where a WDM equipment is used with racks and subracks having at least a plurality of slots for transponder boards, the scheme comprising:

starting with the first transponder board, providing a first optical channel allocated at a lowest possible wavelength, continuing with a second transponder board, providing a second optical channel at a highest possible wavelength, allocating, in an alternate manner, the following optical channels: odd number optical channels, including the first optical channel, with increasing wavelength from the lowest available wavelength and even number optical channels, including the second optical channel, with decreasing wavelength from the highest available wavelength, wherein the optical channels are balanced around a saturation channel.

2. A wavelength allocation scheme according to claim 1 using an interleaving factor between the optical channels.

3. A wavelength allocation scheme according to claim 2 using an interleaving factor equal to the number of sub racks in the WDM equipment.

4. A wavelength allocation scheme according to claim 2 using an interleaving factor equal to an integer divisor of a maximum number of optical channels.

5. A wavelength allocation scheme according to claim 2 allocating the progressively added optical channels as far as possible from the saturation channel.

6. A wavelength allocation scheme used in a WDM network where a WDM equipment is used with racks and subracks having at least a plurality of slots for transponder boards, the scheme comprising:

starting with the first transponder board, providing a first optical channel allocated at a highest possible wavelength, continuing with a second transponder board, providing a second optical channel at a lowest possible wavelength, allocating, in an alternating manner, the following optical channels: odd numbered optical channels, including the first optical channel, with decreasing wavelength from the highest available wavelength, and even numbered optical channels, including the second optical channel, with increasing wavelength from the lowest available wavelength, wherein the optical channels are balanced around a saturation channel.

7. A wavelength allocation scheme according to claim 6 using an interleaving factor between the optical channels.

8. A wavelength allocation scheme according to claim 7 allocating the progressively added optical channels as far as possible from the saturation channel.

* * * * *